Patented Sept. 7, 1954

2,688,458

UNITED STATES PATENT OFFICE 2,688,458

CLASSIFIER AND CONTROLLER FOR WEIGHT-CHECKING DEVICES

Warren J. Schieser and Richard M. White, Columbus, Ohio, assignors to The Exact Weight Scale Company, Columbus, Ohio, a corporation of Ohio Application March 27, 1951, Serial No. 217,796

30 Claims. (Cl. 249—2)

Our invention relates to a classifier and controller. It has to do, more particularly, with a system which checks and classifies a series of successive articles in regard to a characteristic thereof which may vary, and performs a control function if such characteristic varies in a preselected order in successive articles. This control function may be used in obtaining the desired characteristic in following articles of the series being checked.

The application of statistical method to control of a variable characteristic in a plurality of products, while having distinct advantages, is difficult to achieve on many high-speed production lines. The reason for such difficulty in application is due to the inability of devices of the prior art to translate desired knowledge at a speed commensurate with the rate of production of the particular product under consideration.

For purposes of simplification, and ease of presentation, the application of our invention will be described only in connection with a specific variable, that is, weight. However, it is to be understood that other variables such as linear measurements, electromotive forces, color, et cetera, may be effectively dealt with by means of our invention.

In the packaged food industry where single factories produce as much as one million or more packaged items daily, the net weight of each of such packages must be closely controlled within certain positive and negative limits, or tolerances, as measured from a selected weight because of weight ordinances and economic reasons.

Obviously, it is economically impractical to have a package contain the exact desired weight of product therein. The actual weight of the product contained in a package is usually made slightly more than the exact net weight indicated thereon. Additional quantity of product in a package above the indicated value on the package of the net weight represents a quantity of product which the manufacturer is literally "giving away" to the consumer. While this quantity in each individual package is sometimes slight, in comparison to the total weight of that package, when it is remembered that sometimes more than one million packages containing such an excess of product are produced daily, there is represented a total quantity of product corresponding to a considerable amount of money.

It is the practice, in such packaging operations, to measure the quantity of product placed in a package by means of a dispenser which dispenses a certain amount of the product either by volume or by weight. A knowledge of the density of the product, the particular head of product in the dispensing apparatus, and other factors, enables approximately the desired weight of product to be obtained in each package. Unfortunately, various external and unknown factors influence the amount of product dispensed, so that the particular dispenser has to be frequently adjusted in order to obtain a product having a net weight within certain desired positive and negative values above and below a selected desired weight.

Depending, of course, upon the material being handled and various other factors, the particular product being dispensed may be dispensed from a single dispenser at a rate approaching as high as 90 packages per minute. Obviously, the cost involved in manually check-weighing the weights of such packages would be prohibitive.

There exists, and is on the market at the present time, a weight checking machine called the "Selectrol." This device is disclosed in detail in the U. S. patent of Flanagan et al., No. 2,323,023, of June 29, 1943. As shown in such patent, the "Selectrol" actually comprises a continuous conveyor type of weighing device which weighs a package as it moves along a conveyor. It has, associated with it, controls which shunt packages which are overweight, beyond a certain desired limit, and underweight, beyond a certain desired limit, onto separate slides or conveyors to be carried to points where such overweight and underweight conditions in those packages may be corrected or the packages may be discarded. Packages which are within the prescribed weight tolerances are permitted to be carried on the necessary conveying system to further operations such as wrapping or boxing. The "Selectrol" indicates whether a particular package is of a selected desired weight or the quantity that such package is overweight or underweight as compared with such desired weight.

It should be apparent to those skilled in the art of statistical methods of quality control that information obtained from a checking machine such as the "Selectrol" could be utilized to constantly recalibrate or adjust the dispenser which is continuously filling packages with commodities or products which are check-weighed on such a "Selectrol."

There does not exist in the prior art a device which could be used to effect such a desired result.

The main object of our invention is to provide a classifying and controlling system which is particularly useful with a measuring or checking machine to classify a series of successive articles in regard to a characteristic thereof which may vary and to perform a control function if such characteristic varies in consecutive articles in a preselected order.

Another object of our invention is to provide a system of the type indicated above which may use the control function in obtaining the desired characteristic in following articles of the series being checked.

Another object of our invention is to provide a device which can be used in conjunction with a weight-checking machine to classify successive packages according to any overweight or underweight variation therein and if there is a weight variation in a predetermined number of consecutive packages, to recalibrate or adjust the dispenser which is filling the following packages in order to obtain exact weight in the filled packages.

There is obtainable from the "Selectrol" a value of voltage which is proportionate to the weight of the quantity of product above or below a selected desired weight for each article or package which passes through the checking machine. In this machine, a negative voltage is developed if the total weight of the package is above the desired weight, and a positive voltage is developed if the total weight of the package is below the desired weight. As each package leaves the weighing portion of the conveyor, it creates an actuating impulse by interrupting a light beam in a photoelectric cell circuit. These two factors, the difference in weight of a particular packaged product from a desired weight, as represented by a particular voltage value, which may be either positive or negative, and an impulse from the interruption of a photoelectric cell circuit, are utilized as control factors by the system constituting our invention.

Our invention is embodied in a device which will be described hereinafter and this device is particularly useful with the weight-checking machine described above but its use is not limited thereto. This device may be used with various other measuring or checking machines or devices which will supply a positive or negative voltage value or a proportional voltage value corresponding to either the difference in the desired variable from a selected value or the total value of such a variable. Moreover, while it is indicated above that a photoelectric cell circuit is utilized to supply a control impulse to the device in which our invention is embodied, it should be apparent readily that mechanical devices or other devices may be used to supply such an impulse.

In the attached drawings, we have illustrated one form of device which we may use in obtaining the above-indicated objects.

Figure 1:
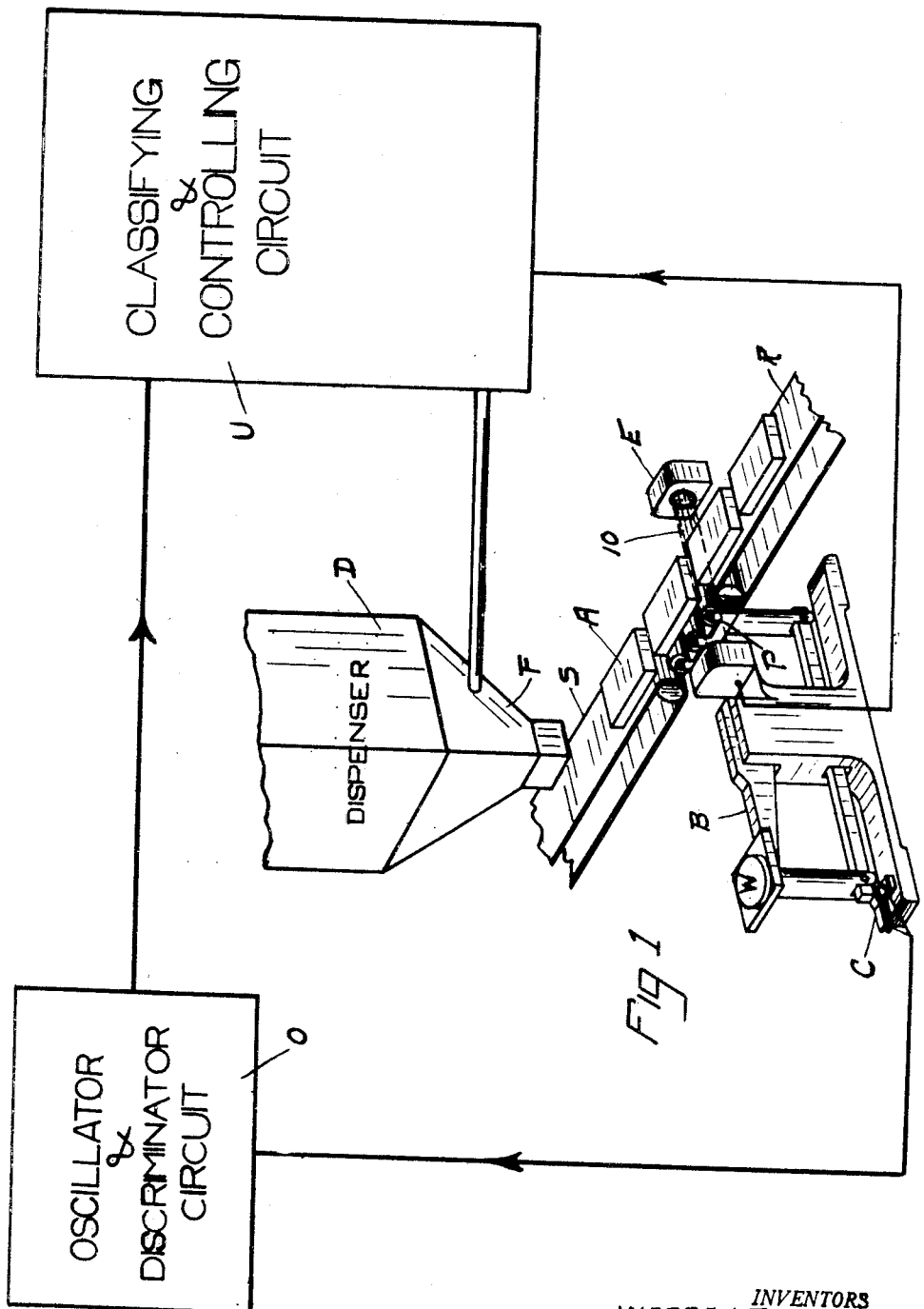
Figure 1 is a schematic view showing our device associated with a weight-checking machine.

With reference to the drawings, in Figure 1 we have illustrated basic elements of a weight-checking machine of the "Selectrol" type. It comprises a weighing beam B of the over-and-under weight type which has a counterweight or weight platform W at one end and the commodity portion P at the other end that is part of a conveyor line. The packages A to be check-weighed are supplied by a conveyor section S of the conveyor line which carries the filled packages away from a dispenser D. The filler spout F of dispenser D can be controlled in a suitable manner to vary the volume of material supplied to each package. Another conveyor section R of the continuous line removes the check-weighed packages A from the conveyor section P. Associated with the counterweight end of the beam B is a condenser C which forms a part of an oscillator and discriminator circuit O of the type disclosed in Patent No. 2,323,023. Movement of the plates of condenser C, caused by movement of beam B, results in a variation in the oscillating frequency of circuit O and results in an output voltage. An amplifying circuit may be provided between circuit O and our device U, if desired. The packages A move continuously and successively across the conveyor section P and the beam B will move to a position of equilibrium corresponding to the weight of that package. The conveyor section P may have an electric eye or photoelectric relay system E associated therewith so that as each article A passes from the conveyor section P, the light beam thereof is broken.

Figure 2:
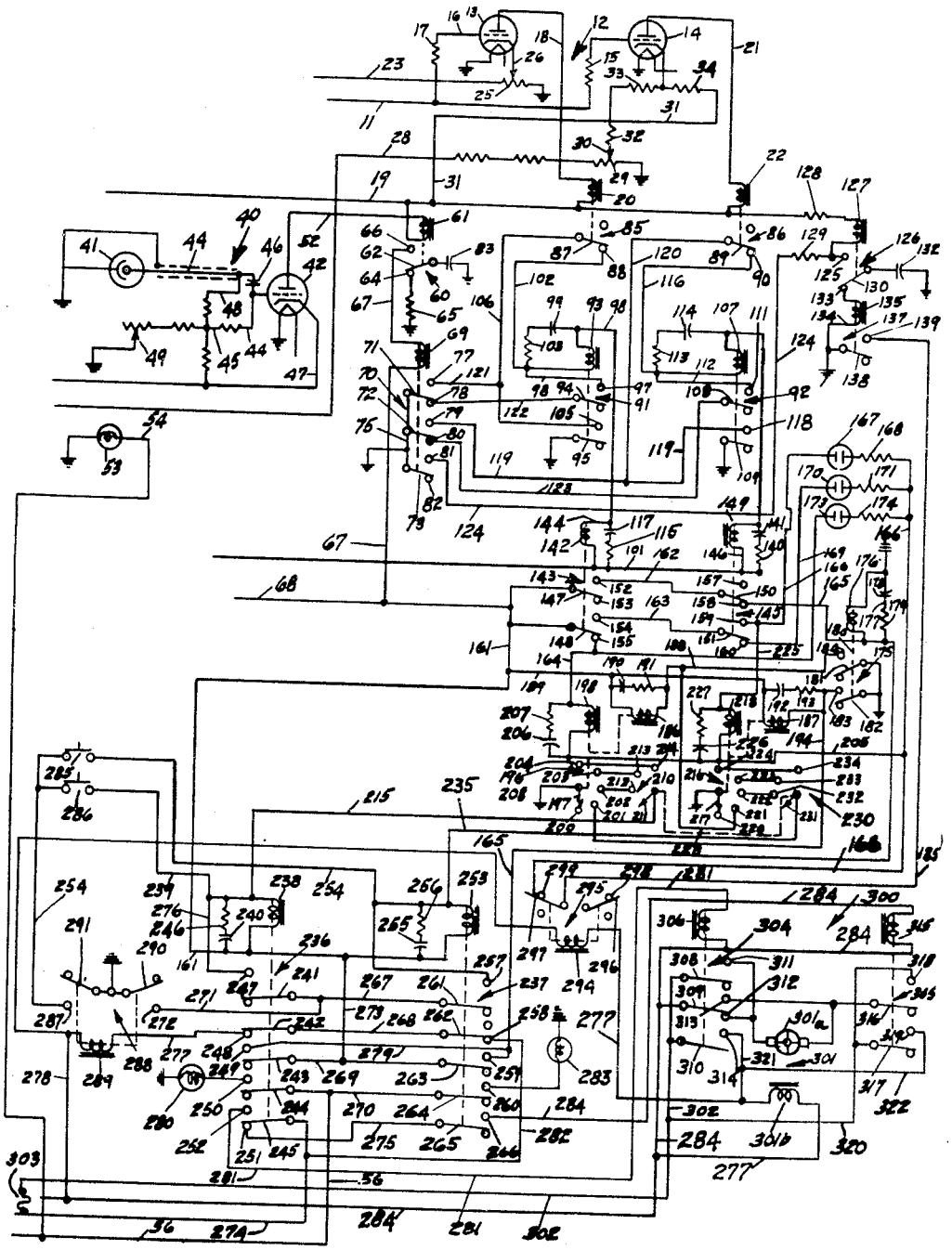
Figure 2 is a diagram of the complete electric circuit of our device.

The circuit of our classifying and controlling device U is shown diagrammatically in Figure 2.

The input for this circuit is through the line 11 which runs from the oscillator and discriminator circuit O of the checkweighing machine. Such machine may be of the type disclosed in Patent No. 2,323,023 or the line 11 may connect to any other frequency discriminator circuit developing an output voltage. This input line will supply proportional voltage, depending upon the amount of and the direction of deflection of beam B. For purposes of discussion, the voltages developed by displacement of the weight lever B will be considered positive if the beam is in underweight position, and negative if in overweight position.

The first unit of our circuit is an underweight and overweight classification and tolerance control unit 12. This unit will be actuated by the discriminator voltage and will provide both an overweight tolerance and an underweight tolerance adjustment. It can be set so that the input voltage through line 11 must have a predetermined value before it will affect our device. The error in weight of a package must exceed a predetermined amount in order to actuate correction control mechanism of our device which will be described in detail later. If the input voltage is of sufficient value, either underweight or overweight, it will be classified by this unit and used to actuate such correction control mechanism.

The unit 12 comprises the underweight classifying tube 13 and the overweight classifying tube 14. These tubes are shown, for example only, as triodes with indirectly heated cathodes. The input line 11 is connected directly to the grid of the tube 14 and has a resistance 15 therein. The line 11 is connected by branch 16 to the grid of tube 13 and has a resistance 17 therein. The plate of tube 13 is connected by a lead 18 to a line 19 which supplies positive regulated voltage from a suitable source, the lead 18 having a relay solenoid 20 interposed therein. Similarly, the plate of tube 14 is connected by a lead 21 to the line 19 and has a solenoid 22 therein. A potentiometer, comprising resistance 25 and adjustable contact 26 with its associated resistance network provides voltage adjustment means for varying the bias on tube 13, the power being supplied from a suitable source through line 23. Similarly, a potentiometer comprising resistance 29 and adjustable contact 30 with its associated resistance network provides voltage adjustment means for varying the bias on tube 14, the power being supplied from a suitable source through line 28 which includes other resistances as shown. The contact 30 is connected to line 31 and this line is provided with resistance 32 in series with the contact and is also provided with resistances 33 and 34, the line 31 connecting to the line 19.

The potentiometer which includes adjustable contact 26 serves as a variable underweight tolerance control. The potentiometer which includes adjustable contact 30 serves as a variable overweight tolerance control. Thus, the tubes 13 and 14 will serve to classify the input voltage as being produced by underweight or overweight packages and if the current is of sufficient value, will pass the classified current on to control the proper circuits of our device.

As previously indicated, in addition to the control factor created by an overweight or underweight package, an impulse produced each time a package leaves the check-weighing scale is used as a control factor for our device. This impulse is created and supplied to our device by means of the photoelectric circuit 40, shown in Figure 2, which is part of the electric eye system previously referred to and associated with conveyor section P. It will permit sampling of the discriminator voltage from circuit O at the proper instant.

The circuit 40 comprises the photoelectric tube 41 which is actuated by a light beam from a suitable source as indicated in Figure 1. The light beam, as shown in Figure 1, is so located relative to the conveyor line that the package A, which has been check-weighed, will have progressed completely across the weight-checking conveyor section P and will interrupt the light beam as it moves onto receiving section R. This permits the beam or lever B to reach a position, determined by the weight of package A being check-weighed, before the light beam is interrupted by such package. The circuit 40 also includes the amplifying tube 42 and an associated capacitor-resistor network. The anode of tube 41 is connected to lead 44 which leads to a set of resistances 45, a condenser 46 being interposed in lead 44, the lead being connected to the grid of tube 42. The set of resistances 45 is also connected across lines 44 and 47 by a branch 48 which connects to lead 44. The line 47 supplies bias voltage from a suitable source to the cathode of tube 42 and this voltage can be adjusted by means of a potentiometer including one of the resistances of the set 45 and an adjustable contact 49. The plate of tube 42 is connected to line 52 which is the output line for the photoelectric tube circuit 40. The source of light for the tube 41 is shown in Figure 2 as being a lamp 53 connected in a line 54 which is connected to a power supply line 56 which supplies current from a suitable source.

A relay-actuated keying switch 60 is controlled by the photocell amplifier tube 42. This switch includes the solenoid 61, connected to lines 19 and 52, which actuates a switch arm 62 that normally engages a fixed contact point 64. A resistance 65 is connected to point 64. Another fixed contact point 66 is associated with arm 62 and is connected to a line 67 which connects with a power line 68 that leads from a suitable power source. The solenoid 61 is energized to move arm 62 into contact with point 66 and keep it there during the interval in which the light beam for photocell 41 is blanked.

Actuation of switch 60, as indicated above, will actuate a relay controlled locking switch 70. This switch 70 includes the solenoid 69 which has its coil connected in series in line 67 and which actuates the ganged contact arms 71, 72 and 73 which are connected together by grounded line 75. The arms 71, 72 and 73 normally engage the respective points 78, 80 and 82 but may be moved into engagement with the respective points 77, 79 and 81.

The keying switch 60 actuates the switch 70 each time the photocell light beam is blanked. Energizing the solenoid 61 of switch 60 energizes the solenoid 69 of switch 70, and solenoid 69 remains energized momentarily, with its energizing interval controlled by charging of capacitor or condenser 83 which is connected in series with the coil of solenoid 69 when switch arm 62 engages point 66. It will be noted that one end of condenser 83 is connected to switch arm 62 and its other end is grounded.

The underweight solenoid 20 of classification unit 12 controls a switch 85 and the overweight solenoid 22 thereof controls a switch 86. The switch 85 includes a switch arm 87 which normally contacts with fixed contact point 88. The switch 86 includes a switch arm 89 which normally contacts with fixed point 90. The switch 85 controls a relay-actuated switch 91 and the switch 86 controls a relay-actuated switch 92.

The switch 91 includes the solenoid 93 which actuates the ganged switch arms 94 and 95. The arm 94 is adapted to be moved into engagement with a point 97 which is connected to a line 98 which connects with a line 101 which supplies power from a suitable source. The coil of the solenoid 93 is connected in series in a line 102 which connects with line 98, the line 102 also connecting to contact point 88 of switch 85. The arm 95 is grounded and is adapted to be moved into engagement with a point 105 which is connected by lead 106 to the arm 87 of switch 85. Connected in parallel with the coil of the solenoid 93 is resistor 103 and condenser 99 which comprise an arc quench network.

The switch 92 includes the solenoid 107 which actuates the ganged switch arms 108 and 109. The arm 108 is adapted to be moved into engagement with a point 111 which is connected by a line 112 which is also connected to the power line 101. The coil of the solenoid 107 is connected in series in a line 116 which connects with the line 112, the line 116 also connecting to contact point 90 of switch 86. The arm 109 is grounded and is adapted to be moved into engagement with a point 118 which is connected to a line 119 that connects with point 79 of switch 70. A lead 120 runs from line 119 to the arm 89 of switch 86. Connected in parallel with the coil of the solenoid 107 is resistor 113 and condenser 114 which comprise an arc quench network.

The contact points of switch 70 are connected in the circuit as follows: point 77 is connected by lead 121 to line 106; point 78 by lead 122 to arm 94 of switch 91; point 79 by line 119, as indicated above, to point 118 of switch 92 and by lead 120 to arm 89 of switch 86; point 80 by line 123 to arm 108 of switch 92; point 81 by line 124 to the contact point 125 of a relay-actuated switch 126.

The switch 126 includes the solenoid 127, the coil of which is supplied with voltage through power line 19 and dropping resistance 128. Coil 127 is connected to line 124 between a resistance 129 and the contact point 125. This switch also includes an arm 130 which is connected to a condenser 132. The arm 130 normally engages contact point 133 which is connected to a grounded line 134 in which the coil of solenoid 135 is disposed. The solenoid 135 is part of switch 137 which includes an arm 138 which is connected to line 134 and which is adapted to be moved into engagement with contact point 139. It will be noted that arm 130 of switch 126 is actuated by solenoid 127 and that arm 138 of switch 137 is actuated by solenoid 135.

The switches 85 and 86 also control the respective switches 143 and 145. Switch 143 includes a solenoid 142, the coil of which is connected in series in line 144 which connects to lines 98 and 101. Connected in parallel with the coil of the solenoid 142 is resistor 115 and condenser 117 which comprise an arc quench network. Switch 145 includes solenoid 149, the coil of which is connected in series in line 146 which connects with line 112 and line 101. Connected in parallel with the coil of the solenoid 149 is resistor 140 and condenser 141 which comprise an arc quench network. The solenoid 142 actuates the ganged arms 147 and 148 of switch 143 and the solenoid 149 actuates the ganged arms 150 and 151 of switch 145. The switch 143 and the switch 145, as will later appear, control stepping relay circuits which may correct setting of the filler spout F and also control certain signal lights which indicate when a correction is being made and whether the correction is due to underweight or overweight in the packages classified.

With reference to switch 143, it will be noted that arm 147 normally engages point 153 but may engage point 152 and that arm 148 normally engages point 155 but may engage point 154. With reference to switch 145, it will be noted that arm 150 normally engages point 158 but may engage point 157 and that arm 151 normally engages point 160 but may engage point 159. The arms 147 and 148 are connected to a line 161 which receives power from the line 68. The point 152 is connected to arm 150 by lead 162, the point 154 is connected to arm 151 by lead 163, and the point 155 is connected to a lead 164. The point 158 is connected to a lead 165, the point 159 is connected to a line 166 which has the lamp 167 and resistance 168 connected in series therein, the point 160 is connected to line 169 which has the lamp 170 and resistance 171 connected in series therein and connects with the line 166. The lead 164 has the lamp 173 and resistance 174 connected in series therein and connects with the line 166.

The lead 165 from point 158 of switch 145 leads to a relay switch 175. This switch includes the solenoid 176 which has its coil connected in a branch leading from line 165 to a line 177 which leads from line 165. Connected in parallel with the coil of the solenoid 176 is resistor 179 and a condenser 178 which comprise an arc quench network. The solenoid 176 actuates the ganged and grounded switch arms 181 and 182 to move them into contact with the respective contact points 183 and 184.

The switch 175 controls the reset coils 186 and 187. The coil 186 is connected in a line 188 which connects with the point 184 of the switch 175, the coil receiving current through line 189 and the line 161 which receives power from line 68. An arc quench network is provided by condenser 190 and resistor 191 connected in parallel with coil 186. The coil 187 receives current through line 189 in which it is connected and the condenser 192 and resistor 193 are connected in parallel with this coil and comprise an arc quench network. The line 189 connects with a line 194.

The reset coil 186 is associated with an underweight stepping switch 196 and the reset coil 187 is associated with an overweight stepping switch 216. The stepping switch 196 includes the grounded contact arm 197 which is moved step-by-step in a counterclockwise direction into engagement with the successive contact points 201, 202, 203 and 204. Initially contact arm 197 engages the dead contact point 200. The arm 197 is swung in a counterclockwise direction by means of the solenoid 198. The coil of solenoid 198 is connected to line 164. Connected in the line 205, which connects to line 166, in parallel with the coil of solenoid 198 is condenser 206 and resistor 207 which serve as an arc quench network. The point 201 is connected to line 194 which connects to point 183 of relay switch 175. The other points 202, 203 and 204 are connected to corresponding contact points of a selector switch section 210.

The selector switch section 210 includes the movable contact arm 211 and the fixed contact points 212, 213 and 214. The points 202, 203 and 204 of stepping switch section 196 are connected directly to the points 212, 213 and 214, respectively, of selector switch section 210. The arm 211 is connected to a lead 215.

The reset coil 187 is associated with an overweight stepping switch 216. The stepping switch includes the grounded contact arm 217 which is moved step-by-step in a counterclockwise direction into engagement with the successive fixed contact points 221, 222, 223 and 224. Initially contact arm 217 engages the dead contact point 220. The arm 217 is swung in a counterclockwise direction by means of the solenoid 218. The coil of solenoid 218 is connected by lead 225 to line 166, which connects to contact point 159 of relay switch 145. Connected in parallel with the coil of solenoid 218 is condenser 226 and resistor 227 which serve as an arc quench network. The point 221 is connected by lead 228 to line 188 which connects point 184 of relay switch 175 to coil 186. The other points 222, 223 and 224 are connected to corresponding contact points of a selector switch section 230.

The selector switch section 230 includes the movable contact arm 231 which cooperates with the contact points 232, 233 and 234. The contact points 222, 223 and 224 of stepping switch 216 are connected directly to the respective contact points 232, 233 and 234 of stepping switch 230. The arm 231 is connected to a lead 235. The two selector switch sections 210 and 230 form a composite selector switch with the respective contact arms 211 and 231 connected for movement together. The selector switch may be set so that arm 211 will engage any of points 212, 213 and 214 and simultaneously arm 231 will engage the corresponding point 232, 233 or 234.

As will later appear, more clearly, the setting of the selector switch, consisting of sections 210 and 230, determines the number of out of tolerance packages that must be consecutively classified before our device will function to control correction of the filler spout F. The selector switch may be set so that our device will function to control correction of the filler spout F after either 2, 3 or 4 packages or articles are classified consecutively overweight or underweight. It will be understood that the circuits of our device may be varied so that it will function to correct the filler spout F for different numbers of consecutive underweight or overweight packages and that we are not limited to the numbers 2, 3 or 4. Furthermore, the arrangement may be such that the number of underweight packages classified before correcting the filler will be different from the number of overweight articles so classified. With the device shown, as will later appear, after the number of consecutive underweight articles, for which the selector switch is set, have been classified, the reset coil 186 will function, to reset the arm 197 on its initial contact 200. This reset coil will also function if a correct weight article or an overweight article intervenes in the series for which the selector switch is set. Similarly, after the number of consecutive overweight articles, for which the selector switch is set, have been classified, the reset coil 187 will function to reset the arm 217 on its initial contact 220. This reset coil will also function if a correct weight article or an underweight article intervenes in the series for which the selector switch is set.

The lead 215 from selector switch arm 211 is connected to a relay switch 236 and the lead 235 from selector switch arm 231 is connected to a relay switch 237. The switch 236 includes a solenoid 238, the coil of which is connected to lines 239 and 161. A condenser 240 and associated resistor 246 are connected in parallel with the coil of solenoid 238 and serve as an arc quench network. The solenoid 238 actuates the ganged switch arms 241, 242, 243, 244 and 245. Upon actuation of solenoid 238, the arm 241 is engaged with contact point 247, the arm 242 is moved away from point 248, the arm 243 is engaged with point 249, the arm 244 is engaged with point 250 and the arm 245 is moved away from point 251 and into engagement with point 252. The switch 237 includes a solenoid 253, the coil of which is connected in line 161 that is connected to a line 254 and to lead 235. In parallel with the coil of solenoid 253, a condenser 255 and an associated resistor 256 are connected and serve as an arc quench network. The solenoid 253 actuates the ganged switch arms 261, 262, 263, 264 and 265. Upon actuation of solenoid 253, the arm 261 is engaged with contact point 257, the arm 262 is moved away from point 258, the arm 263 is moved into contact with point 259, the arm 264 is engaged with point 260, and the arm 265 is engaged with point 266. The arms 241, 242, 243, and 244 are connected directly to the respective arms 261, 262, 263, and 264 by the leads 267, 268, 269 and 270. Lead 267 is connected to lead 271 which leads to a fixed contact point 272. Lead 269 is connected to line 161 by lead 273. Lead 270 is connected to power line 56. The arm 245 is connected to the line 274 which supplies power from a suitable source. The arm 265 is connected by lead 275 to contact point 251. The contact points of switch 236 are connected in the circuit as follows: point 247 by lead 276 to line 239; point 248 by lead 277 through coil 289 to a line 278; point 249 by lead 279 to line 165; point 250 to one side of an underweight-indicating lamp 280; point 251 as indicated above; and point 252 to the line 281. The contact points of switch 237 are connected in the circuit as follows: point 257 to the line 254; point 258 to the lead 282 which connects to line 274; point 259 to the line 165; point 260 to one side of an overweight-indicating lamp 283; and point 266 to a line 284.

The line 254 has a manual overweight correction pushbutton 285 connected therein and the line 239 has a manual underweight correction pushbutton 286 connected therein. By means of button 285, the switch 237 can be actuated and by means of button 286 the switch 236 can be actuated.

The line 254 is continued on from switch 285 and is connected to a contact point 287 of a time delay relay switch 288 which also includes the point 272. The switch 288 includes the solenoid 289 which is adapted to actuate the switch arms 290 and 291, which are grounded, to move them into engagement with the respective points 272 and 287. The coil of the solenoid 289 is connected in lead 277. The line 278 connects to line 277 and to the power line 284 which connects to a suitable source of power. Connected in series in the line 277 is the coil of solenoid 294 which is a part of the time delay relay switch 295. This switch includes the arms 296 and 297 adapted to be moved away from the points 298 and 299. The arm 297 is connected to line 185, which leads from switch 137, and the point 299 is connected to line 166.

The various relay switches, selector switches, and stepping switches so far described are for controlling the correction motor circuits indicated generally at 300 and which control a correction motor 301. This motor is mechanically connected to the filler spout F to control the feed of commodity therethrough. The correction motor is of the reversible type. The motor rotates in one direction to increase the output of the filler spout and in a reverse direction to decrease the output of the filler spout.

Power connections for the circuits 300 are made through the line 277 which is connected to the solenoid coil of switch 295, and through a line 302 which is a source of suitable voltage. A fuse 303 is connected between line 302 and line 274. The motor 301 is controlled by an underweight relay-actuated switch 304 and an overweight relay-actuated switch 305. The switch 304 includes the solenoid 306, the coil of which is connected in line 281 which connects to the contact point 252 of relay switch 236. The line 281 is also connected to the line 284 to which the line 277 connects. The solenoid 306 actuates the ganged switch arms 308, 309 and 310, to move arm 308 into contact with point 311, arm 309 away from point 312 and into engagement with point 313, and arm 310 into contact with point 314. The switch 305 includes the solenoid 315, the coil of which is connected in line 284 which runs from the source of power to point 266 of relay switch 237. The solenoid 315 actuates the ganged switch arms 316 and 317 to move arm 316 into contact with point 318 and to move arm 317 into contact with point 319. The arms 308 and 310 of switch 304 are connected to line 302 and the arm 309 thereof is connected to line 284. The points 311 and 312 of this switch are connected directly to one side of armature 301a of the motor 301 while the point 313 is connected directly to the other side of the armature and to the arm 316 of switch 305. The point 314 is connected by lead 321 to line 277. The arm 317 of switch 305 is connected directly to a lead 320 as is the point 318 of such switch and the lead 320 connects to line 302. The point 319 is connected by lead 322 to lead 321. The coil 301b of motor 301 is connected in line 277 in series with coils 294 and 289.

With reference to both Figures 1 and 2, as previously indicated, our system will correct the feed of the filling spout F whenever a predetermined number of packages or articles A are consecutively classified underweight or overweight by our device. The device which we have illustrated will function to classify 2, 3 or 4 packages or articles but obviously the circuit can be varied to classify groups of articles of higher numbers. The number of articles which our device will function to classify before the correction motor 301 is actuated is determined by the setting of the selector switch, including ganged arms 211 and 231, which are set on corresponding points of the respective groups 212, 213, 214 and 232, 233 and 234 of contact points, for classifying 2, 3, or 4 consecutive out of tolerance packages. Thus, for our device to function to actuate correction motor 301, the checking scale 10 must introduce a series of consecutive input voltages due to underweight or a series of consecutive input voltages due to overweight, the number of each series depending upon the setting of the selector switch. Furthermore, as previously indicated, the input voltage from the discriminator circuit must be of proper polarity and of sufficient value to actuate either underweight relay switch 85 or overweight relay switch 86, due to the discriminator voltage overcoming the bias voltage on tubes 13 and 14 which is determined by the setting of movable contact 26 or the setting of movable contact 30.

The photocell circuit 40, as previously indicated, is actuated by each successive package A moving off the weight-checking section P, which serves to actuate the keying switch 60, by blanking the photocell 41. Actuation of switch 60 actuates the switch 70. Actuation of switches 60 and 70 occurs for each weighed package. Switch 70 momentarily completes circuit to switches 91 and 143; and to switches 92 and 145; provided the weight of a package A is such as to cause switches 85 and 86 to deenergize or close, as indicated. If the package is underweight, switches 85 and 86 are both energized or opened; thus, switches 91 and 143 are deenergized and also switches 92 and 145 are deenergized. If the package is correct weight, switch 85 is deenergized and switch 86 is energized; thus switches 91 and 143 are energized and switches 92 and 145 are deenergized. If the package is overweight, switches 85 and 86 are deenergized; thus, switches 91 and 143 and 92 and 145 are energized. The light beam of the photocell 41 is located in such a manner that the package A will have progressed all the way across the weighing conveyor section P to interrupt the light beam just before the package leaves such conveyor section. This permits the lever or beam B to reach a position of balance, determined by the weight of the package, and at that instant, as indicated above, switches 91 and 143 and 92 and 145, either energize or deenergize, depending on switches 85 and 86. The effect is to sample the discriminator voltage and classify the commodity at the instant the light beam is interrupted. The relay switch 60 is controlled by the photocell amplifier tube 42 and is energized during the interval in which the light beam is blanked. As indicated above, relay switch 70 energizes simultaneously with switch 60, but remains energized only momentarily, with its energizing interval controlled by charging of the capacitor 83 which is in series with the coil of solenoid 69 of switch 70 when arm 62 of switch 60 is in contact with point 66. The relay switch 70, when actuated by an underweight package, provides ground for the relay switches 91 and 143 through the contact arm 69 and point 77 of switch 70; or the switch 70, when actuated by an overweight package, provides ground for the relay switches 92 and 145 through the contact arm 72 and point 79 of switch 70.

The relay switch 137 operates only after the relay switch 126 has dropped out at the end of the classifying interval. When relay switch 70 energizes momentarily, it actuates switch 126 through contact arm 73 and point 81 of switch 70. During this period, capacitor 132 is charged and when switch 126 deenergizes, upon deenergizing of switch 70, the capacitor 132 discharges through the coil of solenoid 135 of switch 137, with which it is connected in series when arm 138 of switch 126 returns into contact with point 133. Discharging of capacitor 132 through the coil of solenoid 135, causes the arm 138 of switch 137 to engage point 139 for a fixed interval and inserts a time delay between the setting up of the classification through circuit 12 and the operating of underweight stepping switch 196 or overweight stepping switch 216.

As indicated above, switch 70 provides a ground for switches 91 and 143, which either energize or deenergize, depending on the position of the contact arm 87 of classification relay switch 85. For a correct weight article, the relay switch 85 is deenergized or remains deenergized, and ground is provided for relay switch 91 through contact arm 87 and point 88 of switch 85. When switch 70 is operated, it is only momentarily energized and supplies ground through its contact arm 71 and point 77 to the coil of the solenoid 93 of switch 91. Switch 91 and switch 143 then energize and a secondary ground is provided the coils of solenoid 93 of switch 91 and of solenoid 142 of switch 143 through the contact arm 94 and point 97 of switch 91. Contact arm 95 and point 105 of switch 91 also provide a ground to the coil of solenoid 93, which is in series with the coil of solenoid 142 of switch 143, while the arm 71 of switch 70 is completing its excursion from point 77 to point 78. When switch 70 returns to its deenergized position, there is also another ground provided through its arm 71 and point 78 to the coil of the solenoid 93 through contact arm 94 and point 97 of switch 91. At the completion of the classifying interval, the scale returns to underweight position. Switch 91 remains energized through its arm 94 contacting point 97. Switches 91 and 143 remain in this energized condition until a succeeding package of a different weight classification crosses the scale and operates the switches 60 and 70 controlled by the photocell unit 40. Relay switches 92 and 145 operate in a similar manner for an overweight package. The main ground for switch 92 and switch 145 is provided through arm 72 and point 79 of switch 70.

The stepping relay switches 196 and 216 will function as follows:

An underweight article will momentarily close a circuit to the stepping switch 196 which will move the arm 197 to the number one position in engagement with contact point 201. This provides a ground for the reset coil 187 through point 201 and arm 197, causing the stepping switch 216 to reset to the zero position with contact arm 217 moving to point 220. A second underweight package will cause the arm 197 of switch 196 to advance to the number two position in contact with point 202. Thus, two underweight packages, with the selector switch 210 in the number two position, energizes the relay switch 236, which locks in through contact arm 241 and point 247 of switch 236. Energizing of switch 236 opens a voltage supply to the coil of solenoid 289 of time delay relay switch 288, which controls the interval the correction motor 301 drives. Arms 290 and 291 of switch 288 engage the respective contact points 272 and 287 while coil 289 is energized. When coil 289 is deenergized, the time cycle starts and arms 290 and 291 break contact with points 272 and 287 upon completion of the time cycle, thus causing relay switch 236 to deenergize and voltage is once more supplied to the coil of the time delay relay switch 288, through contact arm 242 and point 248 of switch 236, thus closing contact arms 290 and 291 of switch 288. Ground is provided to arm 241 of switch 236, but since switch 236 is deenergized at this time there is no lock-in circuit provided through arm 241 since it is spaced from point 247. At the instant the switch 236 energizes, a circuit is completed through its contact arm 243 and point 249 to reset coils 186 and 187, respectively, through contact points 183 and 184 of auxiliary switch 175, resetting the stepping relay circuits for a succeeding correction cycle. The lamp 280 is lit through contact arm 244 and point 250 of switch 236, each time such switch is energized, for visually indicating an underweight correction.

A correct weight article will not cause completion of a circuit to stepping switch 196. Relay switch 85, as previously indicated, is deenergized or remains deenergized for a correct weight package and, therefore, contact arm 87 thereof is closed against point 88, which energizes relay switches 91 and 143. Energizing of switch 143 moves arm 148 thereof away from point 155, thus preventing current from reaching the coil of stepping switch 196. Relay switch 236 is, consequently, not engaged and ground remains on the arm 241 of switch 236 through the contact arm 290 of time delay relay 288. Contact arm 241 is out of engagement with point 247 and, therefore, no ground is provided for the relay coil of switch 236. For a correct weight article, the relay switch 175 is energized to return stepping switch 196 or 216 to normal or zero position, provided either stepping switch has advanced previously. This is accomplished by supplying current through contact arm 147 and point 152 of switch 143 and contact arm 150 and point 158 of switch 145 through the relay coil of switch 175 and thus resets the stepping switches 196 and 216. Time delay relay switch 288 does not operate unless a correction is made because power to the coil of this relay is provided through contact arm 242 and point 248 of switch 236.

For an overweight article, assuming selector switch 230 is set for two consecutive overweight articles, a circuit is completed momentarily to stepping switch 216 and the arm 217 thereof is moved into contact with the first point 221 which results in energizing the reset coil 186 through the arm 217 and point 221. A second overweight article will actuate the stepping switch 216 to cause its arm 217 to move into engagement with the second point 222. This will result in relay switch 237 being energized and locked in through its contact arm 261 and point 257 and contact arm 290 of time delay relay 288 which will be contacting the respective points 272 and 287 at this time. When switch 237 is energized, contact arm 262 thereof swings away from point 258 and thereby power is removed from the coil of time delay relay 288. When switch 237 is energized, it supplies power through its arm 263 and point 259 to energize the relay switch 175 thus resetting stepping switches 196 and 216. Ground is provided by switch 175 for stepping relay resetting switch coils 186 and 187 through its contact arm 181 and point 184 and through its contact arm 182 and point 183, respectively. Time delay relay 288 controls the time interval during which the correction motor 301 drives. At the end of the predetermined time interval, contact arms 290 and 291 of relay 288 will open, removing ground from the coil of relay switch 237, which then will deenergize. Lamp 283 is illuminated by engagement of contact arm 264 and point 260 of switch 237 to provide a visual indication of an overweight correction.

The motor correction relay circuits will function as follows:

The underweight correction relay switch 304 is energized through the engagement of contact arm 245 with point 252 of the underweight control switch 236. The overweight correction relay switch 305 is energized through the engagement of contact arm 265 with point 266 of overweight control switch 237. The time interval during which either of these switches 304 or 305 remains energized is controlled by the time delay relay 288 which controls the coils of switches 236 and 237 and through contacts 245 and 252 of switch 236 or through contacts 265 and 266 of switch 237, depending on the type of correction to be made, by controlling the energized interval for switch 236 or 237. Therefore, the time delay relay 288 indirectly controls the time interval during which motor correction relay switches 304 and 305 will be energized. When the switch 304 is energized, it causes the correction motor 301 to increase the output of the filling spout F. At the same instant, the time delay relay 295 is energized through contact arm 310 engaging point 314 of switch 304. Contact arm 297 of relay 295 is swung away from point 299 thereof and this serves to prevent advancing of the stepping switches 196 and 216, since the circuits thereto are broken. Preventing the stepping switches from operating, prevents the weight-checking machine 10 from functioning with our device to classify succeeding packages, which are on the conveyor line between the filler spout F and the scale, for a predetermined time interval. At the end of such time interval, arm 297 swings again into engagement with point 299 which results in the resumption of classifying of packages which are filled after correction has been made to the filler spout F. The overweight correction motor switch 305 operates in the same manner but when energized causes the correction motor to reduce the output of the filler spout F. Time delay relay 295 is controlled by contacts 317 and 319 of relay switch 305 and operates in the same manner as for underweight correction. Relay switch 305 is controlled by relay switch 237 through its contacts 265 and 266 in the same manner that switch 236 controls switch 304.

The correction motor 301 can be actuated manually, if desired. Pushing the underweight correction button 286 provides ground to the coil of switch 236 or pushing the overweight correction button 285 provides ground to the coil of switch 237, both being provided through the contact point 287 and arm 291 of time delay relay 288. If either pushbutton is depressed during the time the correction motor 301 is driving, nothing will happen until the relay 288 has completed its time cycle and arm 291 has contacted point 287.

The lamps 167, 170 and 173 are provided to indicate the weight category of each package or article crossing the scale, that is, overweight, correct weight, or underweight. For an underweight package or article, the lamp 173 is controlled by contacts 148 and 155 of switch 143. Contacts 148 and 154 of switch 143 and contacts 151 and 160 of switch 145 control lamp 170 for a correct weight package or article. Overweight lamp 167 is controlled by contacts 143 and 154 of switch 143 and arm 151 and contact 159 of switch 145. These lights thus provide visual indication of the classification of each package or article.

It will be apparent from the above description that our system will classify successive packages on a weight-checking machine and will control a dispenser in accordance with the classification of a series of successive packages as overweight or underweight to obtain correct weight in succeeding packages filled by the dispenser. However, as indicated previously, our system is not limited to the classification of articles according to weight but may be used in classifying articles according to other characteristics.

Having thus described our invention, what we claim is:

1. In combination with means for checking a series of successive articles in regard to a measurable physical characteristic thereof which may vary and including electronic means for creating an output voltage that varies in accordance with the variation in such physical characteristic of successive articles; electronic control means connected to the first electronic means for receiving the output voltage therefrom as an input voltage, said means including a control circuit actuated by said first electronic means only when said characteristic varies in a preselected manner in a series of consecutive articles checked by said checking means, and keying means connected to said control circuit and actuated by each successive article to permit the control circuit to sample for an instant any output voltage from the first electronic means created by the particular article actuating said keying means.

2. In combination with a device for checking a series of successive articles in regard to a measurable physical characteristic thereof which may vary above or below a selected norm and including electronic means for creating an output voltage that varies in accordance with the variation in such physical characteristic from the norm of successive articles; a classifying and controlling circuit connected to said device for receiving the output voltage therefrom as an input voltage, said circuit including a classifying unit for classifying the input voltage on the basis of whether the article being checked by said device corresponds to the norm or is above or below it, and a control unit connected to the classification unit, said control unit including control means and means connected in said classifying and controlling circuit for actuating said control means only upon the classification of consecutive input voltages in a predetermined order, a keying switch connected to said classifying circuit, and means actuated by each successive article for operating said keying switch to permit the classifying circuit to receive any output voltage from said electronic means created by the particular article actuating said keying switch.

3. The combination of claim 2 wherein the classifying unit is provided with an adjustable tolerance control which can be set so that an input voltage must have a selected value before it will be classified.

4. The combination of claim 3 including indicating circuits connected to said classification unit for indicating the classification of each successive article.

5. The combination of claim 4 including indicating circuits connected to said control unit for indicating when it is functioning.

6. The combination of claim 2 wherein said control unit includes means for varying the order.

7. In combination with a weight-checking device for checking a series of successive articles in regard to variation of their weight from a selected standard and including electronic means for creating an output voltage in accordance with the weight of successive packages; a classifying and controlling circuit connected to said device for receiving the output voltage therefrom as an input voltage, said circuit including a classifying unit for classifying the input voltage on the basis of whether the article being checked by said device is underweight, correct weight, or overweight, and a control unit connected to the classification unit, said control unit including control means and means connected in said classifying and controlling circuit for actuating said control means only upon the classification of consecutive input voltages in a predetermined order, a keying switch connected to said classifying circuit, and means actuated by each successive article for operating said keying switch to permit the classifying circuit to receive any output voltage from said electronic means created by the particular article actuating said keying switch.

8. The combination of claim 7 wherein the classification unit includes adjustable tolerance controls.

9. The combination of claim 8 including indicating circuits connected to the classification unit for indicating the classification of the articles being checked.

10. The combination of claim 9 including indicating circuits connected to said control unit for indicating when it is functioning.

11. In combination with a weight-checking device for checking a series of successive packages in regard to variation of their weight from a selected standard and including electronic means for creating an output voltage in accordance with the weight of successive packages; a filler for filling packages prior to checking and means for supplying the packages to said checking device; a classifying and controlling circuit connected to said device for receiving the output voltage therefrom as an input voltage, said circuit including a classifying unit for classifying the input voltage on the basis of whether the package being checked by said device is underweight, correct weight, or overweight, and a control unit connected to the classification unit for receiving the voltage therefrom, said control unit including control means connected to said filler and means connected in said classifying and controlling circuit for actuating said control means only upon the classification of a selected number of consecutive packages being checked as overweight or underweight so as to correct said filler to obtain succeeding packages of correct weight.

12. The combination of claim 11 wherein the weight-checking device includes means for removing the checked articles therefrom, a switch for controlling sampling of the output voltage from said checking device by said circuit, and means for actuating said switch each time a package leaves said checking device.

13. The combination of claim 12 wherein said last-named means comprises a photocell circuit which is associated with the checking device so that the cell thereof is blanked as each checked article leaves the checking device.

14. The combination of claim 11 wherein the weight-checking device includes means for removing the checked articles therefrom, a switch for controlling sampling of the output voltage from said checking device by said circuit, means for actuating the switch each time a package leaves said checking machine, and said classification unit including adjustable tolerance controls.

15. The combination of claim 14 including indicating circuits connected to the classification unit for indicating the classification of the articles being checked.

16. The combination of claim 15 wherein said control means for the filler includes a reversible electric motor and control circuits therefor, and indicating circuits connected to said control unit for indicating whether the motor is functioning to correct overweight or underweight conditions.

17. The combination of claim 16 wherein the control means connected to the filler includes means which may be selectively adjusted to vary the number of consecutively classified packages required to cause the control unit to correct the filler.

18. In combination with a device for checking a series of successive articles in regard to a measurable physical characteristic thereof which may vary above or below a selected norm and including electronic means for creating an output voltage if such characteristic thereof does vary from the norm; a classifying unit connected to said device for receiving the output voltage therefrom as an input voltage, said unit including electronic means for classifying the input voltage on the basis of whether the input voltage thereto is created by an article having a characteristic which corresponds to the norm or varies above or below the norm, a control unit connected to said classifying unit, said control unit being actuated by a pair of actuating switches selectively actuated by voltage classified by said classifying unit and also by a lock-in switch, a keying switch actuated by each successive article checked by said checking device and actuating said lock-in switch, said control unit also including a stepping switch controlled by each of said actuating switches, and means controlled by each of said stepping switches.

19. The combination of claim 18 including means for moving the articles to and from said checking device, a photocell relay unit associated with the means for moving the articles from said device and so arranged that the light beam thereof is broken as each successively checked article moves from said device, said keying switch being controlled by said photocell relay unit and actuated only upon a predetermined stepping of each stepping switch in accordance with a preselected variation of successive articles in regard to said physical characteristic.

20. The combination of claim 18 wherein said electronic means of the classifying unit includes adjustable tolerance controls for selecting the value of voltage required to actuate said control unit actuating switches.

21. The combination of claim 18 wherein said control unit includes a selector switch for selecting the number of steps required of each stepping switch before it controls said last-named means.

22. The combination of claim 21 wherein reset means is provided for resetting the stepping switches.

23. In combination with a device for checking a series of successive articles in regard to a measurable physical characteristic thereof which may vary above or below a selected norm including means for conducting the articles thereto and removing them therefrom and electronic means for creating an output voltage if such characteristic of an article checked does vary from the norm; a classifying unit connected to said device for receiving the output voltage therefrom as an input voltage, said unit including electronic means for classifying the input voltage on the basis of whether the input voltage thereto is created by an article having a characteristic which corresponds to the norm or varies above or below the norm, said electronic means including adjustable tolerance controls for varying the amount of voltage required to selectively operate either of a pair of solenoids connected to said means, a control unit including a pair of actuating switches actuated by said solenoids and a lock-in switch, a keying relay switch, means associated with the means for removing the articles from the checking device for actuating the keying switch and actuated by each successive article checked, said control unit also including a relay-actuated stepping switch controlled by each of said actuating switches, means controlled by each of said stepping switches, a selector switch connected to said stepping switches for selecting the number of steps required of each stepping switch before it controls said last-named means, and reset coils connected with each of said stepping switches for resetting each switch.

24. The combination of claim 23 wherein the control unit includes a series of relay switches connected to each stepping switch, each of said series being controlled by said lock-in switch and one of said actuating switches.

25. The combination of claim 24 including an additional relay switch actuated by said lock-in switch, a time delay relay in the circuit with and actuated by said additional switch, said time delay relay being connected in the circuit with said stepping switches to prevent advancing of said stepping switches for a predetermined interval after actuation of said additional relay switch.

26. The combination of claim 25 including an additional relay switch connected in the circuit with each of said stepping switches for controlling said means controlled by the stepping switches, the additional relay switches also controlling said reset coils of the stepping switches, and an additional time-delay relay connected in the circuit with said additional relay switches for controlling said switches.

27. The combination of claim 26 wherein said last-named means comprises an electric motor, and circuits to said motor controlled by each of said additional relay switches actuated by the stepping switches.

28. The combination of claim 27 wherein indicating circuits are also connected to said motor circuits.

29. The combination of claim 28 wherein the means for actuating said keying switch energizes it only momentarily.

30. The combination of claim 29 wherein the additional relay switch actuated by the lock-in switch is provided with means for energizing it only momentarily.

References Cited in the file of this patent

UNITED STATES PATENTS

| Number | Name | Date |
|---|---|---|
| 1,089,680 | Sloan | Mar. 10, 1914 |
| 2,007,371 | Hopkins | July 9, 1935 |
| 2,197,823 | Young | Apr. 23, 1940 |
| 2,323,023 | Flanagan | June 29, 1943 |
| 2,477,395 | Sunstein | July 26, 1947 |
| 2,446,125 | Callender | July 27, 1948 |
| 2,484,594 | Spangenberg | Oct. 11, 1949 |
| 2,503,295 | Palmer | Apr. 11, 1950 |
| 2,503,513 | Schellman | Apr. 11, 1950 |
| 2,512,879 | Roggenstein | June 27, 1950 |
| 2,534,801 | Siltamaki | Dec. 19, 1950 |
| 2,565,121 | Clardy | Aug. 21, 1951 |

FOREIGN PATENTS

| Number | Country | Date |
|---|---|---|
| 601,392 | Great Britain | 1948 |
| 601,393 | Great Britain | 1948 |